United States Patent
Maney et al.

(10) Patent No.: US 12,154,167 B1
(45) Date of Patent: Nov. 26, 2024

(54) POINT OF SALE BUDGETING SYSTEMS AND METHODS

(71) Applicant: United Services Automobile Association (USAA), San Antonio, TX (US)

(72) Inventors: Will Kerns Maney, San Antonio, TX (US); Zachery C. Lake, Aubrey, TX (US); Yevgeniy Viatcheslavovich Khmelev, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 318 days.

(21) Appl. No.: 17/549,403

(22) Filed: Dec. 13, 2021

Related U.S. Application Data (60) Provisional application No. 63/125,033, filed on Dec. 14, 2020.

(51) Int. Cl.
*G06Q 40/02* (2023.01)
*G06F 9/451* (2018.01)
*G06Q 20/20* (2012.01)
*G06Q 30/0283* (2023.01)
*G06Q 30/0601* (2023.01)

(52) U.S. Cl.
CPC .......... *G06Q 40/02* (2013.01); *G06F 9/451* (2018.02); *G06Q 20/201* (2013.01); *G06Q 30/0283* (2013.01); *G06Q 30/0631* (2013.01); *G06Q 30/0639* (2013.01)

(58) Field of Classification Search
CPC ............. G06Q 40/02; G06Q 20/201; G06Q 30/0283; G06Q 30/0631; G06Q 30/0639; G06F 9/451
USPC .......................................................... 705/20
See application file for complete search history.

(56) References Cited

U.S. PATENT DOCUMENTS

| | | | |
|---|---|---|---|
| 9,495,703 B1* | 11/2016 | Kaye, III | G06Q 40/00 |
| 11,544,766 B1* | 1/2023 | Medina, III | G06Q 30/0623 |
| 2016/0247237 A1* | 8/2016 | Grigg | G06Q 40/12 |
| 2016/0314466 A1* | 10/2016 | Wind, III | G06Q 20/387 |

OTHER PUBLICATIONS

U.S. Appl. No. 17/161,926, filed Jan. 29, 2021, Shawn D. Low.
U.S. Appl. No. 17/388,643, filed Jul. 29, 2021, Reynaldo Medina, III.

* cited by examiner

*Primary Examiner* — Garcia Ade
(74) *Attorney, Agent, or Firm* — Fletcher Yoder, P.C.

(57) ABSTRACT

A budget management guidance system includes a portable device having processing circuitry and a storage device. The processing circuitry is configured to receive product imagery related to a product, determine a purchase price of the product based on the product imagery, access a budget goal for a user from the storage device, and instruct output of a notification on a graphical user interface of the portable device in response to determining that the purchase price of the product exceeds the budget goal for the user.

20 Claims, 3 Drawing Sheets

POINT OF SALE BUDGETING SYSTEMS AND METHODS

CROSS-REFERENCE TO RELATED APPLICATION

The present application claims the benefit of and priority to U.S. Provisional Patent Application Ser. No. 63/125,033, titled "POINT OF SALE BUDGETING SYSTEMS AND METHODS," which was filed on Dec. 14, 2020, and which is herein incorporated by reference in its entirety for all purposes.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A point of sale (POS) is generally understood to reference a place and/or a point in time where a transaction (e.g., a retail or service transaction) is performed. Traditionally, at the point of sale, a provider (e.g., a merchant) coordinates with a purchaser (e.g., a customer) to exchange goods and/or services for payment. As a specific example, a purchaser may identify a desired purchase (e.g., a particular item of merchandise or a particular service), and the provider may then determine and/or request payment of an amount owed by the purchaser for the desired purchase. Upon review of the amount, the purchaser may then pay the provider the amount via a payment method.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a budget management guidance system includes a portable device comprising processing circuitry and a storage device. The processing circuitry is configured to receive product imagery related to a product, determine a purchase price of the product based on the product imagery, access a budget goal for a user from the storage device, and instruct output of a notification on a graphical user interface of the portable device in response to determining that the purchase price of the product exceeds the budget goal for the user.

In one embodiment, a budget management guidance system includes a portable device comprising processing circuitry and a storage device. The processing circuitry is configured to receive an input indicative of a purchase price of a product and receive financial information associated with an account of the user from a financial services system that is separate from the portable device. The processing circuitry is also configured to access an account balance budget goal for a user, wherein the account balance budget goal is only stored locally in the storage device. The processing circuitry is further configured to instruct output of a notification on a graphical user interface of the portable device in response to determining that completing a current purchase of the product will cause a balance of the account of the user to fall below the account balance budget goal for the user.

In one embodiment, a method of operating a budget management guidance system includes receiving, at processing circuitry of a portable device, an input indicative of a purchase price of a product that is part of a current purchase being attempted by a user. The method also includes accessing, via the processing circuitry and from a storage device of the portable device, a budget goal for the user in response to receiving the input indicative of the purchase price of the product. The method also includes comparing, via the processing circuitry, the purchase price of the product and the budget goal for the user. The method further includes instructing, via the processing circuitry, an output of a notification on an additional portable device associated with an additional user in response to determining that the purchase price of the product exceeds the budget goal for the user.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system.

Embodiments of the present disclosure are directed to point of sale budgeting systems and methods. A budget management system may receive budget goals for a user, track purchases made by the user, monitor one or more accounts of the user, and/or provide relevant information (e.g., a notification, which may include a recommendation) to the user to assist the user in achieving the budget goals for the user. The budget management system may receive the budget goals for the user via inputs to a budgeting application on a user device (e.g., a mobile phone or a tablet). Thus, the budget goals for the user may be specific (e.g., unique) to the user. The budget goals for the user may be stored locally on the user device (e.g., in a storage device of the user device). In some embodiments, the budget goals for the user may not be made available outside of the user device (e.g., may not be shared or communicated from the user device to another device) to thereby provide enhanced privacy with respect to the budget goals for the user.

The budget management system may receive purchase data related to the purchases made by the user via point of sale systems associated with merchants. The point of sale systems may be defined as hardware systems that are configured to process payments for goods and/or services. The point of sale systems may utilize software, which may be embedded in the hardware systems (e.g., including tangible, non-transitory, computer-readable media), to perform certain operations associated with the purchases. For example, a point of sale system may include a terminal that is anchored to a checkout counter (e.g., at a retail store) and/or the point of sale system may include a portable device (e.g., a portable barcode scanner). In some embodiments, the point of sale system may include a purchaser point of sale system or device (e.g., the user device) that cooperates with a merchant point of sale system or device (e.g., the terminal, the portable barcode scanner, and/or a remote server), such as when the purchaser uses the user device (e.g., having a mobile payment application stored thereon) to make a mobile payment to the merchant or when the purchaser uses the user device (e.g., having a shopping application stored thereon) to complete an online purchase (e.g., over a network, such as the Internet) from the merchant.

In some embodiments, the purchase data may be provided from the merchant system to the user device. In some such cases, the budget goals and the purchase data may be processed locally at the user device (e.g., without providing the budget goals outside of the user device) to provide the relevant information to the user via the user device. For example, the budget goals may specify a threshold amount the user would like to spend on a certain type of good, such as food items, during a time period. In response to the purchase data for a current purchase for the certain type of good and/or prior purchases for the certain type of good over the time period indicating that a total purchase amount exceeds the threshold amount, the user device may provide the notification with the recommendation to cancel, delay, or otherwise alter the current purchase. The notification may not list or reveal the budget goal itself, or least may not do so without first authenticating the user and/or receiving authorization from the user.

In some embodiments, the budget management system may have access to account information for one or more accounts of the user (e.g., from a financial services system that is associated with a banking institution that manages the one or more accounts for the user). The account information may include an account balance, a history of withdrawals (e.g., payments), and/or a history of deposits (e.g., paychecks), for example. In some embodiments, the account information may be provided from the financial services system to the user device. In some such cases, the budget goals, the purchase data, and the account information may be processed locally at the user device (e.g., without providing the budget goals outside of the user device) to provide the relevant information to the user via the user device. For example, the budget goals may specify a savings amount the user would like to save during the time period. In response to the account information for the time period indicating that completion of the current purchase would cause the account balance to decrease below the savings amount, the user device may provide the notification with the recommendation to cancel, delay, or otherwise alter the current purchase. The notification may not list or reveal the budget goal itself and/or the account information, or least may not do so without first authenticating the user and/or receiving authorization from the user. In this way, the budget management system may assist the user with any of a variety of budget goals, such as budget goals that relate to respective threshold amounts the user would like to spend on the certain types of goods per time period, the savings amount that the user would like to save per time period, a debt payment amount that the user would like to make per time period, or the like.

It should be appreciated that the notification may include the recommendation to cancel, delay, or to otherwise alter the current purchase (e.g., remove item(s) from the current purchase) in order to assist the user in achieving the budget goals of the user. In some embodiments, the notification may include the recommendation to cancel, delay, or otherwise alter at least one of the current purchase or another purchase(s) (e.g., upcoming purchase(s), such as a recurring subscription service payment indicated by the account information) in order to assist the user in achieving the budget goals of the user.

The budget management system may assess the budget goals and provide the notification in real-time or near real-time with the current purchase. The budget management system may be triggered to assess the budget goals and to provide the notification in response to an indication of a current purchase. The indication may include an input by the user (e.g., at the user device, via the budgeting application), initiation of a checkout process (e.g., from the point of sale system), scanning the goods via the terminal or the portable barcode scanner (e.g., using the point of sale system), placement of goods and/or services in a shopping cart for the online purchase (e.g., at the user device, via the shopping application), and/or the merchant system requesting payment authorization from the financial services system.

To facilitate discussion, the examples below are generally discussed in the context of the purchase of good(s); however, it should be appreciated that the embodiments may be adapted for use with the purchase of service(s), such as the purchase of car maintenance services, such as oil changes. Additionally, the present embodiments may obtain the purchase data related to multiple point of sale transactions (including purchases, returns, in-store transactions, online transactions) from multiple point of sale systems to carry out the disclosed techniques. It should be appreciated that the processing steps disclosed herein may be carried out by one or more processors of the budget management system, and the processing steps may be distributed between the one or more processors in any suitable manner. For example, the budget goals may be assessed locally by the one or more processors of the user device and/or the budget goals may be provided to and assessed by the one or more processors of the financial services system.

Figure 1:
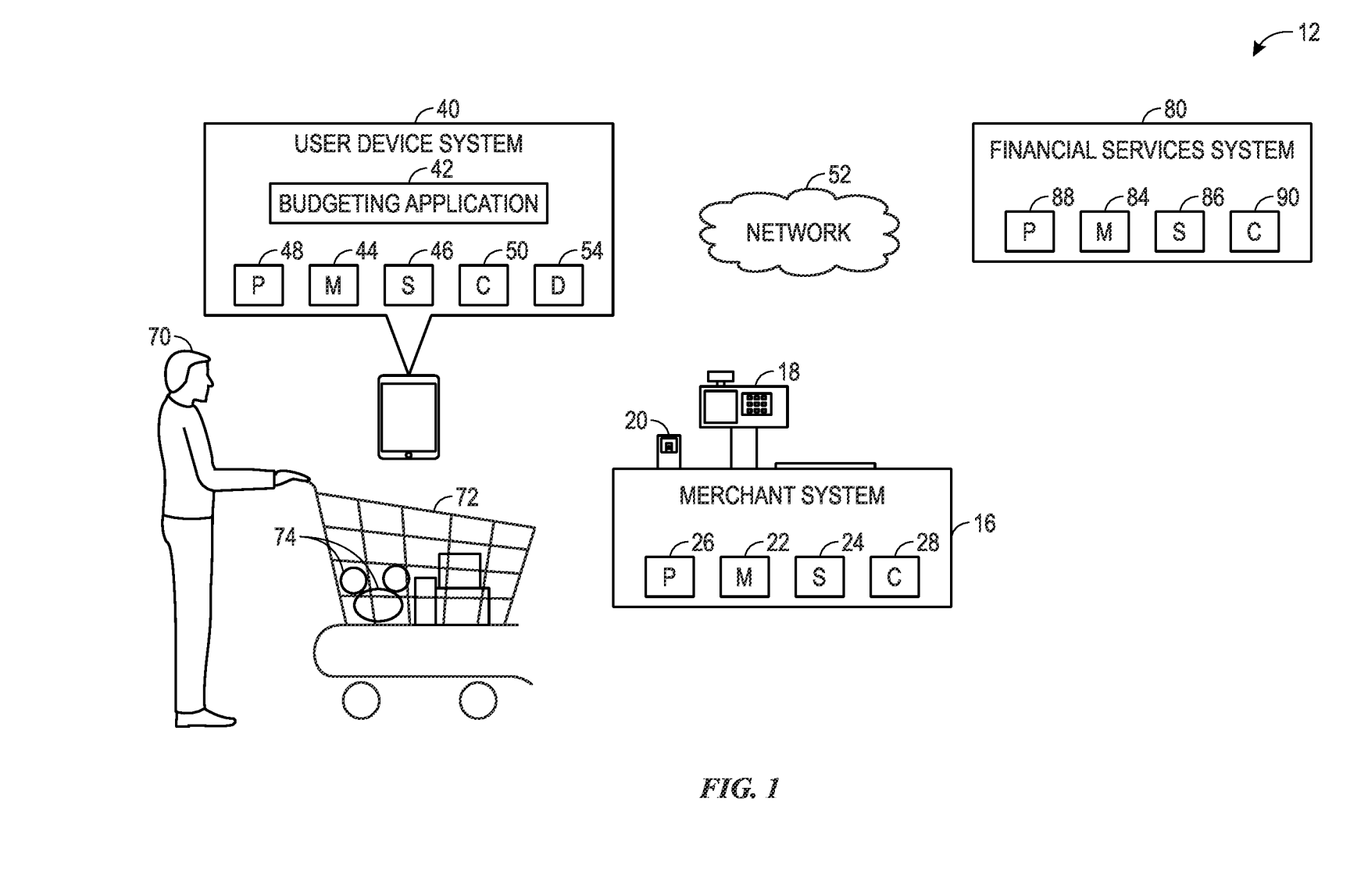
FIG. 1 is a schematic diagram of a budget management system, in accordance with an embodiment of the present disclosure.

FIG. 1 is a schematic diagram of an embodiment of a budget management system 10 (e.g., budget management guidance system). Generally, the budget management system 10 may include various computers, terminals, software applications, and networks. In particular, the budget management system 10 may include multiple point of sale (POS) systems, such as a POS system 12. The POS system 12 may be defined as a hardware system for processing payments for transfer of goods (e.g., items; merchandise) from a merchant (e.g., provider) to a user (e.g., purchaser). It should be noted that, in addition to processing the payments for the transfer of goods, the POS system 12 may also operate to facilitate returns of goods. Each of these functions may be considered a POS transaction.

The POS system 12 may obtain purchase data related to purchases completed by the user. The purchase data may include an identifier of the user (e.g., a unique identifier), a timestamp for the purchase (e.g., date and/or time), characteristics of the good(s) purchased (e.g., a price and a type). To obtain the purchase data, the POS system 12 may include various devices, such as a merchant system 16, a terminal 18, and/or a scanner 20 that is configured to scan a code (e.g., barcode) associated with an item. For example, in a physical retail store, the merchant system 16 may include the terminal 18 with a touch screen display and/or a card reader to enable the user to input the identifier (e.g., a phone number; a card, such as a payment card) and/or the merchant system 16 may include the scanner 20 to scan the code that may be used to obtain various characteristics of the good(s) (e.g., the price and the type). In such cases, the POS system 12 may identify the characteristics of the good(s) by accessing a database and using the code (or other scanned information) to search the database for the good(s) and their associated characteristics, although the POS system 12 may utilize any other techniques to obtain these characteristics of the good(s). It should be appreciated that the POS system 12 may use the merchant system 16 to obtain the purchase data related to purchases that are completed as online POS transactions (e.g., at online retail stores) and that do not occur within any physical retail store.

The merchant system 16 may include a memory device 22 and/or a storage device 24 that stores code (or instructions) and a processor 26 that functions to process the code and control operations in response to the code. The merchant system 16 may also include a communication component 28 that operates to facilitate communication between the merchant system 16 and other components of the budget management system 10. The memory device 22, the storage device 24, the processor 26, and the communication component 28, may be integral with or embedded in the merchant system 16 to perform certain operations associated with the POS transactions. The processor 26 may utilize the communication component 28 to access a time via a network, and the merchant system 16 may utilize the time to provide timestamps for the POS transactions. However, it should be appreciated that the merchant system 16 may additionally or alternatively include an internal clock to provide the timestamps for the POS transactions, or the timestamps for the POS transactions may be obtained in any other suitable manner.

As shown, the budget management system 10 may include a user device 40. In some circumstances, the user device 40 may be part of the POS system 12 and may operate as a purchaser POS system that cooperates with the merchant system 16 to complete the POS transactions. For example, the user may use the user device 40 to make mobile payments to the merchant and/or the user may use the user device 40 (e.g., a shopping application on the user device 40) to complete the POS transaction in the online retail store of the merchant.

The user device 40 may also store a budgeting application 42 that the user may access and utilize to carry out the techniques disclosed herein. During a registration or set-up process, the user may open the budgeting application 42 and may input their own budget goals. The budgeting application 42 may guide the user to establish their own budget goals (e.g., by providing prompts or questions). For example, the budgeting application 42 may suggest to the user that the user choose a savings goal per month, such as by choosing to save one of $50, $100, or $200 per time period (e.g., per month). As another example, the budgeting application 42 may suggest to the user that the user choose to allocate a payment amount, such as $50, 100, or $200 per time period, to pay down a debt (e.g., a payment card debt or a loan, such as a vehicle loan). The budgeting application 42 may enable the user to establish specific goals for various types of goods, such as to spend less than a first amount (e.g., $50, $100, or $200) per time period (e.g., per month) on a first type of good (e.g., clothing items) and/or to spend less than a second amount (e.g., $50, $100, or $200) per time period (e.g., per month) on a second type of good (e.g., food items). In some embodiments, the budget goals that are established by the user may be stored locally on the user device 40. In some embodiments, the budget goals may only be stored locally on the user device 40 and without transfer or communication of the budget goals to another device, which may provide for enhanced privacy with respect to the budget goals.

The user device 40 may include a memory device 44 and/or a storage device 46 that stores code (or instructions) and a processor 48 that functions to process the code and control operations in response to the code. The user device 40 may also include a communication component 50 that operates to facilitate communication between the user device 40 and other components of the budget management system 10. As shown, the components of the budget management system 10 may communicate via one or more networks 52 (e.g., the Internet). The user device 40 may also include a display 54, which may enable the user to visualize features of the budgeting application 42 (e.g., the prompts) as well as notifications (e.g., pop-up notifications) that are provided via the budgeting application 42. The display 54 may be any suitable type of display, such as a liquid crystal display (LCD), plasma display, or an organic light emitting diode (OLED) display, for example.

In operation, the user may use the POS system 12 to attempt to complete a current POS transaction, such as to purchase good(s). In FIG. 1, this is represented as a user 70 having a cart 72 with goods 74; however, as noted above, the user may use the merchant system 16 alone or in combination with the user device 40 to complete the current POS transaction in a physical retail store or in an online store. Regardless of how the user completes the current POS transaction, the current POS transaction may trigger the budget management system 10 to assess the budget goals of the user and to assist the user with achieving the budget goals of the user. For example, an indication of the current POS transaction that is in progress may trigger the budgeting application 52 to open and/or to initiate the assessment of the budget goals in view of the current POS transaction. Furthermore, if the notification is appropriate, the budgeting application 52 may provide the notification (e.g., while the budgeting application 52 is open or as a pop-up notification).

As shown, in some embodiments, the budget management system 10 may include a financial services system 80. The financial services system 80 may be associated with a financial institution that supports one or more accounts (e.g., a checking account, a savings account, an investment account, and/or a payment card account, such as a credit card account). Thus, records of the one or more accounts may provide data indicative of deposits into the one or more accounts, withdrawals from the one or more accounts, and balances of the one or more accounts, for example. The financial services system 80 may include a memory device 84 and/or a storage device 86 that stores code (or instructions) and a processor 88 that functions to process the code and control operations in response to the code. The financial services system 80 may also include a communication component 90 that operates to facilitate communication between the financial services system 80 and other components of the budget management system 10.

In some embodiments, the POS system 12 may provide the identifier, the timestamp, and the characteristics of the good(s) of the POS transactions to the financial services system 80 (e.g., over a time period, such as a month, several months, a year, or more). Various other POS systems may similarly provide this information to the financial services system 80 for each POS transaction carried out by the various other POS systems over the time period. In this way, the financial services system 80 may obtain purchase data from multiple transactions (e.g., associated with multiple users and multiple retail stores). For each user, the financial services system 80 may aggregate, analyze, and/or store the purchase data collected over the time period. For example, the financial services system 80 may use the identifier provided at each POS transaction to link the purchase data to the user. Then, the financial services system 80 may use the purchase data, the information derived from the purchase data, and/or the account information to facilitate the techniques disclosed herein.

It should be appreciated that data, such as the purchase data and the account information, may be shared between the merchant system 16, the user device 40, and the financial services system 80. In some embodiments, the budget goals may be shared outside of the user device 40, such as with the financial services system 80 that may then operate as a primary or central processing system to assess the budget goals and to instruct the notification via the user device 40. However, in some embodiments, the budget goals may be retained locally at the user device 40 and may not be shared outside the user device 40, and thus the user device 40 may operate as a primary or central processing system to assess the budget goals and to instruct the notification via the user device 40. Generally, in order to assist with the budget goals, the one or more processors, which may include one or more of the processors 26, 48, 88, may carry out the processing techniques disclosed herein. It should be appreciated that in cases in which the budget goals are retained locally at the user device 40 and are not shared outside the user device, the processor 48 of the user device 40 may carry out certain steps to enable the budget goals to be remain private and accessible only to the user device 40 while also providing the notification to the user. Furthermore, the notification may not list or include the budget goals and/or the account information, or least may not do so without first authenticating the user (e.g., receiving a username, a password, and/or a biometric marker, such as a facial recognition scan) and/or receiving authorization from the user (e.g., keyed input to request display of the budget goals and/or the account information) for additional privacy for the user.

In operation, the one or more processors of the budget management system 10 may obtain an indication of the current purchase. In response to the indication of the current purchase, the one or more processors may assess the budget goals, the purchase data (e.g., including the type of good(s) of the current purchase), and/or the account information. It should be appreciated that assessment of the data may be carried out by the one or more processors in any of a variety of manners (e.g., by the processor 48 of the user device 40 and/or the processor 88 of the financial services system 80). Furthermore, the exchange of data may be carried out in any of a variety of manners. For example, the purchase data may be provided from the merchant system 16 to the user device 40, and the user device 40 may then request and access the account information for the one or more accounts of the user from the financial services system 80. Then, the processor 48 of the user device 40 may assess the budget goals, the purchase data, and the account information. As another example, upon request for authorization for payment from the financial services system 80 for the current purchase, the financial services system 80 may provide the purchase data and/or the account information to the user device 40 for comparison with the budget goals.

In any case, the budget goals, the purchase data, and/or the account information may be analyzed together to determine whether the current purchase aligns with the budget goals. For example, for the budget goal related to an amount of savings per time period, the one or more processors may calculate a difference between an account balance for the one or more accounts and a cost of the current purchase, and then the one or more processors may compare the difference to the amount of savings per time period. In response to the difference being less than the amount of savings per time period, the one or more processors (e.g., via the budgeting application 42) may recommend that the user cancel, delay, or otherwise alter the current purchase. In response to the difference being more than the amount of savings per time period, the one or more processors (e.g., via the budgeting application 42) may recommend that the user proceed with the current purchase. In some embodiments, the one or more processors may consider an expected amount of deposits over a remainder of the time period (e.g., based on prior time periods) and/or an expected amount of withdrawals over the remainder of the timer period (e.g., based on the prior time periods) to predict whether the current purchase is likely to cause the user to fail to meet the budget goals in view of the expected amount of deposits and/or the expected amount of withdrawals. In response to the cost of the current purchase exceeding the account balance (e.g., available funds), the one or more processors may recommend that the user cancel, delay, or otherwise alter the current purchase. For example, the one or more processors may recommend that the user delay the current purchase until after a next deposit (e.g., paycheck deposit), and the one or more processors may recommend that the user delay the current purchase until a particular date based on prior deposits (e.g., recurring paycheck deposits).

In some embodiments, the one or more processors may collect reviews for the good(s) of the current purchase, such as reviews from one or more other users that utilize the budget application 42 and/or that have one or more other accounts with the financial institution associated with the financial services system 80. For example, upon completion of the current purchase (or at some time thereafter, such as 1, 2, 3, 4, or more weeks later), the user may be prompted (e.g., via the budgeting application 42) to provide a review (e.g., user feedback) for the good(s). In this way, the review may be identified as a valid, unbiased review of the good(s), and the review may be provided to the user and/or to other users during later purchases of the good(s) to assist in deciding whether to complete the later purchases of the good(s). In some embodiments, the one or more processors may utilize the reviews to determine the recommendation for the user, such as whether to recommend to the user that the user cancel, delay, or otherwise alter the current purchase. For example, if the reviews indicate poor quality of the good(s), the one or more processors may recommend that the user cancel the current purchase, particularly if the cost of the current purchase will cause the difference to approach the budget goal (e.g., the reviews may be used to establish a sliding scale for the difference that is acceptable).

In some embodiments, the one or more processors may recommend to the user that the user cancel, delay, or otherwise alter another purchase should the user choose to complete the current purchase. For example, the recommendation may suggest that the user cancel an expected future payment during the time period (e.g., for a subscription service) should the user complete the current purchase in order to achieve the budget goals. It should be appreciated that the budget management system 10 may take other actions in addition to or as an alternative to the notification. For example, the budget management system 10 may block the financial services system 80 from authorizing the current purchase with the payment card until the user acknowledges the notification or otherwise approves the current purchase that is not aligned with the budget goals of the user (e.g., by interacting with the notification; by providing a password or other code to bypass the budget goals). As another example, the budget management system 10 may block the user device 40 from opening the mobile payment application or otherwise completing the mobile payment until the user acknowledges the notification or otherwise approves the current purchase that is not aligned with the budget goals of the user. As yet another example, the budget management system 10 may block the user device 40 from returning to the shopping application or otherwise completing the current purchase with the shopping application until the user acknowledges the notification or otherwise approves the current purchase that is not aligned with the budget goals of the user.

In some embodiments, the budget management system 10 may provide an additional notification to an additional portable device that is associated with an additional user, such as to alert the additional user of the purchase and/or to act another layer to assist the user with their budget goals. For example, the user may set the additional user as their advisor during the set up process, and then, the budget management system 10 may block the financial services system 80 from authorizing the current purchase with the payment card until the additional user acknowledges the additional notification or otherwise approves the current purchase that is not aligned with the budget goals of the user (e.g., by interacting with the additional notification). Importantly, this may be accomplished without sharing certain information with the additional user, such as without sharing the budget goals, account balance(s), and/or product types with the additional user (e.g., the additional notification does not include this information). For example, the additional notification may merely indicate that the user is attempting the current purchase that does not align with the budget goals of the user without providing the budget goals as part of the additional notification.

As mentioned, the one or more processors may be configured to predict whether the current purchase will hinder the user in achieving the budget goals for the time period. For example, the one or more processors may generally utilize forecasting models with inputs of the purchase parameters of the current purchase, the purchase parameters of prior purchases over the time period and/or prior time periods, the account information, and the budget goals to predict whether the current purchase will result in the user failing to achieve the budget goals for the time period. The one or more processors may also be configured to analyze the purchase data to categorize the current purchase, such as to categorize the current purchase as a typical purchase, a recurring or fixed purchase, a necessity purchase, or an impulse purchase (e.g., unnecessary or bored purchase). For example, the timestamp being atypical for the user (e.g., late at night; compared to prior purchases) and/or the type of the good(s) being atypical for the user (e.g., compared to prior purchases) and/or not necessity items (e.g., compared to a stored list of necessity items, which may be set by the user or another entity, such as the financial institution) may indicate that the current purchase should be categorized as an impulse purchase. In response to determining that the current purchase is an impulse purchase, the one or more processors may recommend that the user cancel, delay, or otherwise alter the current purchase, such as to delay the current purchase until the following day (e.g., daytime hours the following day). Generally, the notification related to the budget goals of the user may be provided to the user via the display 54 of the user device 40. The notification may be provided to the user in real-time or near real-time with the current purchase, such as while the good(s) are in the shopping cart of the online store, as the good(s) are scanned with the scanner 20, and/or during request for approval of the payment with the payment card.

It should be noted that the processors 26, 48, 88 may be any type of computer processor or microprocessor capable of executing computer-executable code. Further, each of the processors 26, 48, 88 may be representative of or include multiple processors that may perform processing operations herein described. The memory devices 22, 44, 84 and the storage devices 24, 46, 86 may be any suitable article of manufacture that can serve to store processor-executable code, data, or the like. These articles of manufacture may represent computer-readable media (e.g., any suitable form of memory or storage) that may store the processor-executable code used by the processors 26, 48, 88 to perform the presently disclosed techniques. The memory devices 22, 44, 84 and the storage devices 24, 46, 86 may also store data, various software applications, and the like. It should be noted that non-transitory merely indicates that the media is tangible and not a signal. The communication components 28, 50, 90 may facilitate network communications (e.g., wired or wireless over the network 52).

The components described above are exemplary components and these systems of the present disclosure may include additional or fewer components relative to what is shown. It should be appreciated that the operations may be divided in any suitable manner between the components of the budget management system 10 (e.g., between the merchant system 16, the user device 40, and/or the financial services system 80) and/or any other suitable computing system having one or more processors. It should also be noted that aspects of the budget management system 10 may include or work in conjunction with a cloud-based computing system, server, or the like. For example, the financial services system 80 may represent a bank of servers that perform operations for the user device 40.

The financial services system 80 and other components of the budget management system 10 may include circuitry or software that facilitates association of relevant data for data management purposes. For example, the identifier for the user may be linked with the purchase data for the purchaser (e.g., purchase data related to the good(s)) as part of the storage process and to facilitate retrieval of the account information and/or to trigger the budgeting application 42 running on the user device 40. This data accumulation and organization may provide for efficient notification upon receipt of the purchase data during the current purchase (e.g., as the purchaser uses the POS system 12 to buy good(s)).

Figure 2:
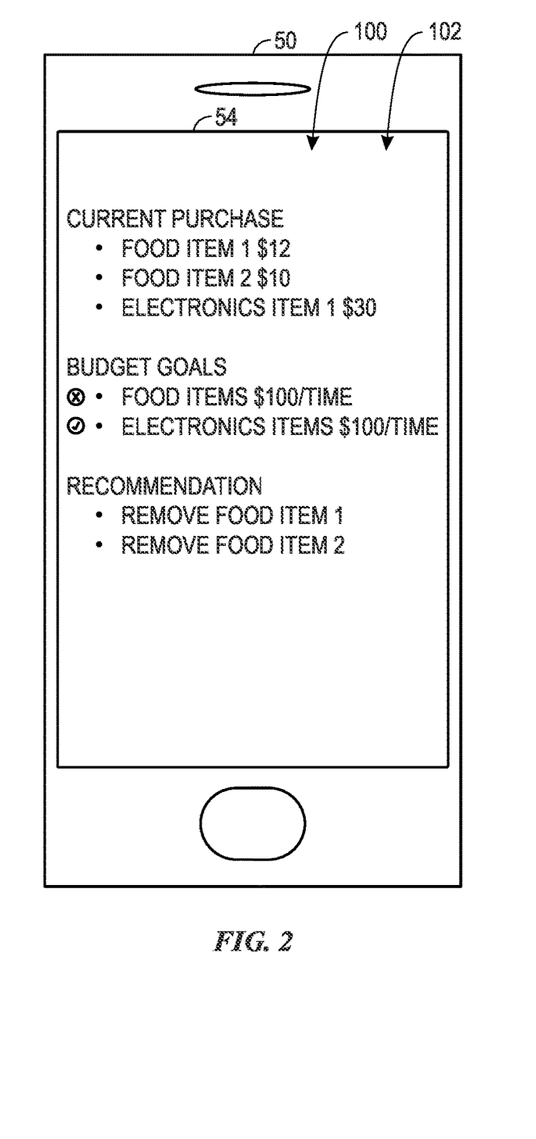
FIG. 2 is a schematic representation of a notification on a graphical user interface that may be presented by the budget management system of FIG. 1, in accordance with an embodiment of the present disclosure.

FIG. 2 is a schematic representation of an embodiment of a notification 100 on a graphical user interface (GUI) 102 that may be presented by the budget management system 10 of FIG. 1. For example, the GUI 102 may be displayed by the display 54 of the user device 40. As discussed above, the notification 100 may be appropriate given the budget goals, the purchase data, and/or the account information. In this way, the GUI 102 may operate to provide visual guidance (e.g., as the user completes a purchase using the POS system).

As shown, the notification 100 may include purchase data for the current purchase, such as a type and a cost of each item in the current purchase. The notification 100 may include a list of relevant budget goals, such as a threshold amount that the user would like to spend for each type of item per time period. The notification 100 may also include a recommendation based on the purchase data and the budget goals. For example, if the purchase of both food items (but not one of the food items) will cause the total cost of food items purchased during the time period to exceed the threshold amount that the user would like to spend for food items during the time period, the recommendation may be to remove one of the food items.

As noted above, the one or more processors may also predict whether the user is on track to exceed the threshold amount by the end of the time period based on prior purchases of food items in prior time periods (e.g., which indicate expected purchases over a remaining time within the time period), the remaining time within the time period, or the like. The one or more processors may assess whether the food items are necessity items, bored purchases, or the like. In such cases, the recommendation may be based on the predictions, the assessment related to the necessity of the food items, or the like. It should be appreciated that the notification 100 may include other information that may be relevant to the user. Furthermore, the information included in the notification 100 is merely exemplary, and this information may be omitted and/or presented in a different manner. It should also be appreciated that different and/or additional information may be included in the notification 100. In some cases, the budget goals may not be provided in the notification 100, or at least not provided (e.g., hidden) until the user is authenticated and/or provides authorization to display the budget goals. For example, the notification 100 may initially only present the "X" under "Budget Goals" without displaying the budget goals themselves. However, the user may select the "X" to authorize (e.g., to request) display of the corresponding budget goals. In some cases, the authorization alone may be insufficient for the notification 100 to reveal the budget goals. Instead, the authorization in combination with some authentication step (e.g., a username, a password, and/or biometrics during an earlier portion of a session with the user device 40, such as upon powering on the user device 40 and/or during a current portion of the session with the user device 40, such as being prompted via the input of the authorization) may be carried out in order to reveal the budget goals.

It should be appreciated that the notification 100 may include selectable features (e.g., icons) or links that are used in other ways. In some cases, the notification 100 may include features that essentially operate as a menu. For example, the user may select the "X" presented next to the budget goal for food items, and the user may then be presented with relevant information, such a list of food items previously purchased over the time period. In some embodiments, the selection of the "Remove" prompt (or other icon or prompt) may send instructions to the merchant system 16 and/or the financial services system 80 to remove charges for one or more items (e.g., the food item listed adjacent to the icon or prompt). In such cases, the merchant system 16 may also prompt a cashier to remove the one or more items from the cart or otherwise not deliver the one or more items to the user. As another example, selection of the "Remove" prompt may direct the user out of the budgeting application and to return to the shopping application to adjust the shopping cart. It should also be appreciated that the GUI 102 may enable the purchaser to make adjustments, such as adjustments to the budget goals. As noted above, the GUI 102 may also include virtual buttons or other links that enable the user to provide an input to approve purchases that are not aligned with the budget goals of the user.

Figure 3:
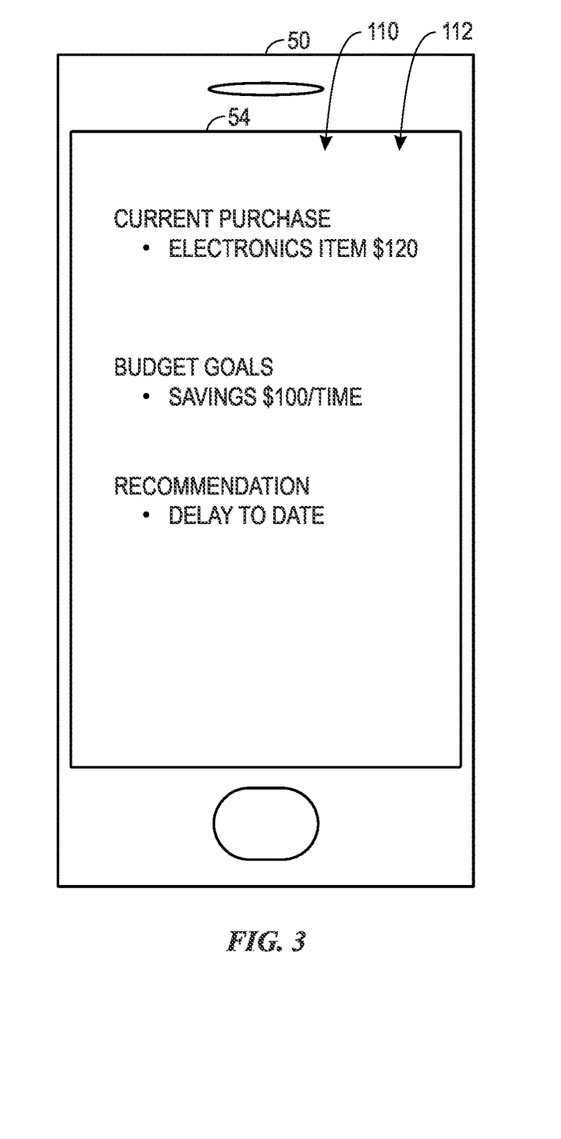
FIG. 3 is a schematic representation of another notification on a graphical use interface that may be presented by the budget management system of FIG. 1, in accordance with an embodiment of the present disclosure.

FIG. 3 is a schematic representation of an embodiment of a notification 110 on a graphical user interface (GUI) 1122 that may be presented by the budget management system 10 of FIG. 1. For example, the GUI 102 may be displayed by the display 54 of the user device 40. As discussed above, the notification 110 may be appropriate given the budget goals, the purchase data, and/or the account information. In this way, the GUI 112 may operate to provide visual guidance (e.g., as the user completes a purchase using the POS system).

As shown, the notification 110 may include purchase data for the current purchase, such as a type and a cost of each item in the current purchase. The notification 110 may include a list of relevant budget goals, such as a savings amount that the user would like to save per time period. The notification 110 may also include a recommendation based on the purchase data and the budget goals. For example, if the purchase of the electronic device will cause an account balance of one or more accounts of the user to fall below the savings amount, the recommendation may be to delay the current purchase until a next time period.

As noted above, the one or more processors may also predict whether the user is on track to meet the savings amount at the end of the time period based on prior purchases in prior time periods (e.g., which indicate expected purchases over a remaining time within the time period), the remaining time within the time period, or the like. The one or more processors may assess whether the electronic item is a necessity item, a bored purchase, or the like. In such cases, the recommendation may be based on the predictions, the assessment related to the necessity of the food items, or the like. It should be appreciated that the notification 110 may include other information or use other information that may be relevant to the user, such as a date of deposit of a next paycheck. Furthermore, the information included in the notification 110 is merely exemplary, and this information may be omitted and/or presented in a different manner. It should also be appreciated that different and/or additional information may be included in the notification 110. In some cases, the budget goals may not be provided in the notification 110, or at least not provided (e.g., hidden) until the user is authenticated and/or provides authorization to display the budget goals.

It should be appreciated that the notification 110 may include selectable features (e.g., icons) or links, and thus, the notification 110 may include features that essentially operate as a menu. For example, the user may select a link (e.g., "Delay") to automatically set (e.g., with one touch) an alarm for the recommended time (e.g., delay time) on the user device and/or to launch another application (e.g., the shopping application or a financial services application, such as a banking application to review more detailed account information). It should also be appreciated that the GUI 112 may enable the purchaser to make adjustments, such as adjustments to the budget goals. As noted above, the GUI 112 may also include virtual buttons or other links that enable the user to provide an input to approve purchases that are not aligned with the budget goals of the user.

Figure 4:
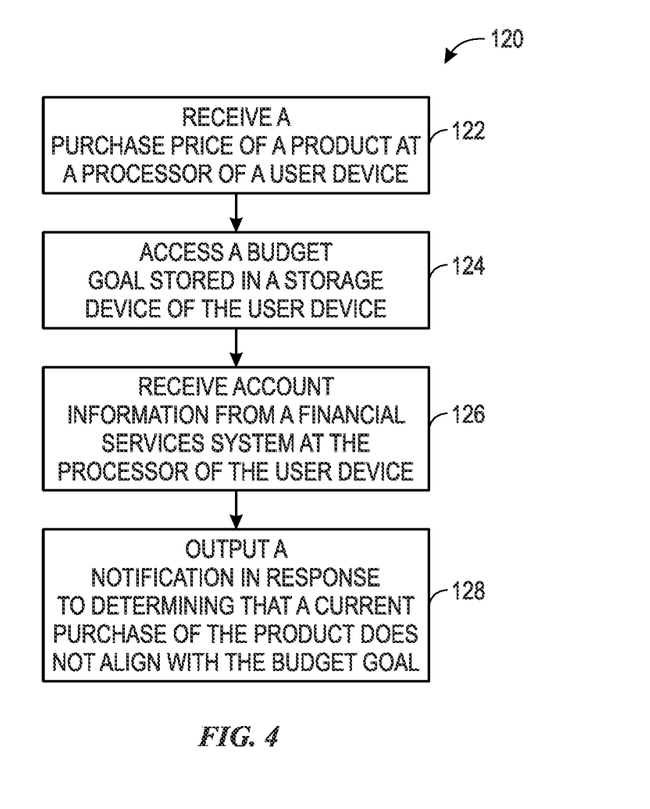
FIG. 4 is a flow diagram of a method of operating the budget management system of FIG. 1, in accordance with an embodiment of the present disclosure.

FIG. 4 is a flow diagram of an embodiment of a method 120 of operating the budget management system 10. The flow diagram includes various steps represented by blocks. Although the flow diagram illustrates the steps in a certain sequence, it should be understood that the steps may be performed in any suitable order and certain steps may be carried out simultaneously, where appropriate. Further, certain steps may be omitted and/or other steps may be added. While certain steps are described as being performed by the processor 48 of the user device 40, it should be understood that the steps or portions thereof may be performed by any suitable processing device within the budget management system 10.

In step 122, the processor 48 of the user device 40 receives a purchase price of a product. The processor 48 may receive the purchase price by receiving product imagery of the product, performing image processing techniques to identify the product, and then looking up the purchase price for the product in a database. The processor 48 may receive the purchase price via a keyed input by the user at the user device 40, via communication with a point of sale system, or any other suitable technique.

In step 124, the processor 48 of the user device 40 accesses a budget goal from a storage device of the user device. As noted herein, the budget goal may be input by the user via a registration process and/or at any other time, such as via a keyed input by the user at the user device 40. The budget goal may only be stored locally on the user device (e.g., only in the storage device of the user device without being communicated outside of the user device) for enhanced privacy for the user.

In step 126, the processor 48 of the user device 40 receives account information from a financial services system. The account information may include an account balance for an account of the user, historical charges authorized and/or withdrawn from the account of the user over prior time periods, or the like.

In step 128, the processor 48 of the user device 40 may output a notification in response to determining that a current purchase of the product does not align with the budget goal (e.g., will cause the user not to meet their saving goal for a current time period; will cause the account of the user to fall below a threshold amount). As noted above, the notification may include recommendations for the user (e.g., actions); however, the notification may not include the budget goal and/or may not include the budget goal without authentication of the user and/or authorization by the user. Such techniques may keep the budget goals out of view of persons other than the user and may therefore provide additional privacy for the user.

The budget management system disclosed herein may operate in other ways and provide other advantages. For example, the user device, which may be a portable device carried by the user, may include a camera that is configured to obtain product imagery (e.g., one or more images related to a product, such as one or more images of the product and/or a price tag of the product). The user device may use the product imagery to determine the purchase price of the product, such as by communicating with the merchant system and/or the financial services systems and/or some other system or database that stores purchase data for multiple different products, including the purchase data that includes the purchase price of the product.

The user device may then access the budget goals for the user (e.g., from the storage device of the user device) and may compare the purchase price of the product to the budget goals for the user. In response to the purchase price of the product exceeding the budget goals for the user, the user device may provide a notification via the user device (e.g., the recommendation, such as to cancel, delay, or alter the purchase of the product). It should be appreciated that the product imagery may be obtained in other ways, such as via a camera or other device (e.g., barcode scanner) of the point of sale system.

Furthermore, the user device may identify an alternative product with a respective purchase price that is lower than the purchase price of the product, and the user device may provide the alternative product and/or a map to the alternative product (e.g., to a store that sells the alternative product) to the user. As noted above, the user device may communicate with the merchant system and/or the financial services systems and/or some other system or database that stores purchase data for multiple different products, including respective purchase data that includes the respective purchase price of the alternative product and/or a location of the alternative product. To the extent that the user device communicates the product imagery or any other indicator of the product(s) from the user device and/or the budget goals from the user device to facilitate the techniques disclosed herein, the user device may attach an anonymizing identifier to thereby provide enhanced privacy for the user. In this way, the budget goals are not associated with identifying information for the user, if the budget goals are communicated from the user device to another system.

Present embodiments are believed to improve upon traditional point of sale mechanisms and budgeting mechanisms by providing guidance, data capture, analysis, comparison, and review capabilities. In view of the features and functionality described in the present disclosure, it is believed that operations related to relevant transactions will be more efficient.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A budget management guidance system, comprising:
a portable device comprising processing circuitry and a storage device, wherein the processing circuitry is configured to:
receive a budget goal via a user input at the portable device, wherein the budget goal sets a threshold value for one or more purchases made by a user during a time period;
store the threshold value only locally in the storage device without communicating the threshold value outside of the portable device;
receive product imagery related to a product;
determine a purchase price of the product based on the product imagery;
access the threshold value from the storage device; and
instruct output of a notification on a graphical user interface of the portable device in response to determining that the purchase price of the product exceeds the threshold value.

2. The budget management guidance system of claim 1, wherein the product imagery is obtained during a current purchase of the product via a point of sale system.

3. The budget management guidance system of claim 1, wherein the processing circuitry is configured to utilize a database to identify an alternative product with a respective purchase price that is lower than the purchase price of the product.

4. The budget management guidance system of claim 3, wherein the processing circuitry is configured to provide a map to the alternative product.

5. The budget management guidance system of claim 1, wherein the processing circuitry is configured to determine the purchase price of the product by communicating the product imagery to a purchase data server with an anonymizing identifier and receiving the purchase price of the product from the purchase data server based on the anonymizing identifier.

6. The budget management guidance system of claim 1, wherein the processing circuitry is configured to;
determine a type of the product based on the product imagery and to analyze the type of the product to categorize a purchase of the product; and
instruct the output of the notification to recommend that the user cancel the purchase of the product in response to the purchase of the product being categorized as an impulse purchase.

7. The budget management guidance system of claim 1, wherein the notification does not include the threshold value.

8. The budget management guidance system of claim 1, wherein the processing circuitry is configured to compare the purchase price to the threshold value locally at the portable device without communicating the threshold value outside of the portable device.

9. The budget management guidance system of claim 1, wherein the processing circuitry is configured to:
receive an account balance budget goal via the user input at the portable device, wherein the account balance budget goal sets an additional threshold value for an account of the user;
store the additional threshold value only locally in the storage device without communicating the additional threshold value outside of the portable device;
receive financial information associated with the account of the user from a financial services system;
access the additional threshold value from the storage device; and
instruct output of another notification on the graphical user interface of the portable device in response to determining that completing a current purchase of the product will cause a balance of the account of the user to fall below the additional threshold value.

10. The budget management guidance system of claim 1, wherein the processing circuitry is configured to instruct a financial services system not to authorize a current purchase of the product by the user in response to determining that the purchase price of the product exceeds the threshold value without communicating the threshold value outside of the portable device.

11. A budget management guidance system, comprising:
a portable device comprising processing circuitry and a storage device, wherein the processing circuitry is configured to:
receive an account balance budget goal via a user input at the portable device, wherein the account balance budget goal sets a threshold value for an account for a user;
store the account balance threshold value only locally in the storage device without communicating the account balance threshold value outside of the portable device;
receive an input indicative of a purchase price of a product;
receive financial information associated with the account of the user from a financial services system that is separate from the portable device;
access the account balance from the storage device; and
instruct output of a notification on a graphical user interface of the portable device in response to determining that completing a current purchase of the product will cause a balance of the account of the user to fall below the account balance threshold.

12. The budget management guidance system of claim 11, wherein the processing circuitry is configured to:
receive the input indicative of the purchase price of the product from a point of sale system that is separate from the portable device and that is configured to process payments for goods; and
access the financial information in response to receipt of the input indicative of the purchase price of the product.

13. The budget management guidance system of claim 1, wherein the processing circuitry is configured to instruct the financial services system not to authorize the current purchase in response to determining that completing the current purchase of the product will cause the balance of the account of the user to fall below the account balance threshold value without communicating the account balance threshold value outside of the portable device.

14. A method of operating a budget management guidance system, the method comprising:
- receiving, at processing circuitry of a portable device, a budget goal via a user input at the portable device, wherein the budget goal sets a threshold value for one or more purchases made by a user during a time period;
- storing, via the processing circuitry, the threshold value only locally in a storage device of the portable device and without communicating the threshold value outside of the portable device;
- receiving, at the processing circuitry, an input indicative of a purchase price of a product that is part of a current purchase being attempted by a user;
- accessing, via the processing circuitry and from the storage device, the threshold value in response to receiving the input indicative of the purchase price of the product;
- comparing, via the processing circuitry, the purchase price of the product and the threshold value; and
- instructing, via the processing circuitry, an output of a notification on an additional portable device associated with an additional user in response to determining that the purchase price of the product exceeds the threshold value.

15. The method of claim 14, comprising:
- instructing, via the processing circuitry, a financial services system that is separate from the portable device to temporarily block authorization of the current purchase in response to determining that the purchase price of the product exceeds the threshold value; and
- instructing, via the processing circuitry, the financial services system to authorize the current purchase in response to receipt of an approval input from the additional portable device.

16. The budget management guidance system of claim 1, wherein the processing circuitry is configured to instruct the output of the notification with the threshold value hidden in the notification until receipt of an additional user input at the portable device to authorize display of the threshold value in the notification.

17. The budget management guidance system of claim 16, wherein the additional user input comprises a password, a biometric marker, a keyed input, a selection of symbol that corresponds to the threshold value, or any combination thereof.

18. The budget management guidance system of claim 1, wherein the processing circuitry is configured to block completion of a payment for an attempted purchase of the product via a mobile payment application on the portable device during the time period in response to determining that the purchase price of the product exceeds the threshold value.

19. The budget management guidance system of claim 1, wherein the processing circuitry is configured to block completion of the payment for the purchase of the product via the mobile payment application on the portable device during the time period by blocking access to the mobile payment application.

20. The budget management guidance system of claim 1, wherein the processing circuitry is configured to block completion of the payment for the purchase of the product via the mobile payment application on the portable device until receipt of an additional user input at the portable device to acknowledge the notification.

* * * * *